No. 609,581.
C. R. HARRIS.
BICYCLE.
(Application filed Aug. 20, 1896.)
Patented Aug. 23, 1898.
(No Model.)
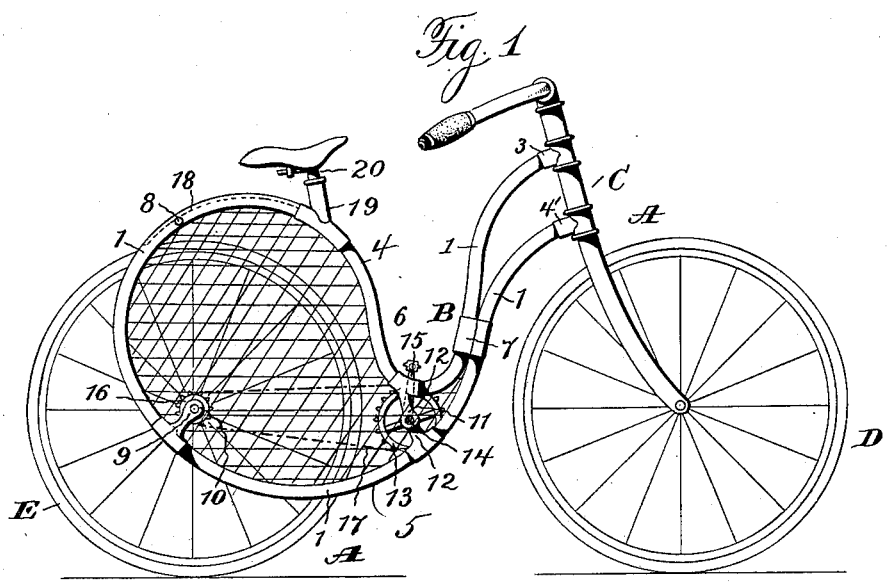
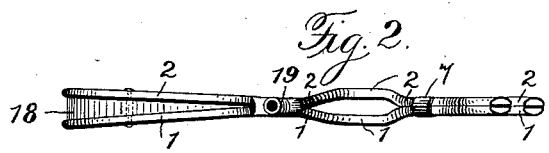
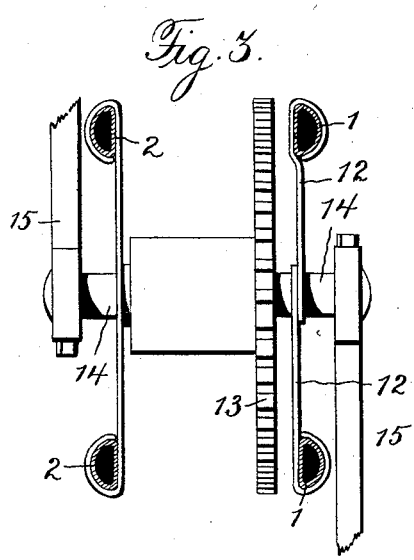
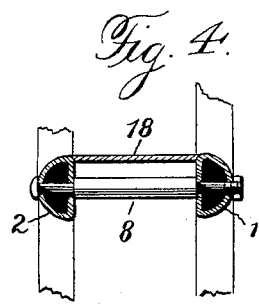
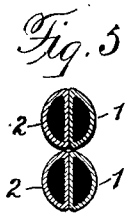
Witnesses
Jas. E. Hutchinson.
G. F. Downing.
Inventor
C. R. Harris
By H. A. Seymour
Attorney
THE NORRIS PETERS CO., PHOTO-LITHO., WASHINGTON, D. C.

UNITED STATES PATENT OFFICE.

CHARLES R. HARRIS, OF WILLIAMSPORT, PENNSYLVANIA.

BICYCLE.

SPECIFICATION forming part of Letters Patent No. 609,581, dated August 23, 1898.

Application filed August 20, 1896. Serial No. 603,362. (No model.)

*To all whom it may concern:*

Be it known that I, CHARLES R. HARRIS, a resident of Williamsport, in the county of Lycoming and State of Pennsylvania, have invented certain new and useful Improvements in Bicycles; and I do hereby declare the following to be a full, clear, and exact description of the invention, such as will enable others skilled in the art to which it appertains to make and use the same.

My invention relates to an improvement in bicycles, and more particularly to that class known as "drop-frame" or "ladies'" bicycles.

The object of the invention is to construct a drop-frame bicycle which shall be capable of withstanding heavy strain without twisting or in any manner becoming weakened.

A further object is to construct a drop-frame for bicycles which shall possess an adequate amount of stiffness and rigidity and at the same time be somewhat resilient in its rear portion.

A further object is to so construct a bicycle-frame as to avoid the use of the ordinary chain and wheel guards.

A further object is to construct a single-sweep bicycle-frame the parts of which shall be so united between their ends as to avoid the necessity for the use of braces or suspension-rods.

A further object is to construct a bicycle-frame in such manner that by the addition of lacing-cords the entire mechanism will be protected.

A further object is to produce a drop-frame for bicycles which shall be simple in construction and effectual in all respects in the performance of its functions.

With these objects in view the invention consists in certain novel features of construction and combinations and arrangements of parts, as hereinafter set forth, and pointed out in the claims.

In the accompanying drawings, Figure 1 is a perspective view of a bicycle embodying my invention. Figs. 2, 3, 4, and 5 are views illustrating details.

A represents my improved bicycle, comprising in general the frame B, steering-head C, front wheel D, and rear wheel E.

In constructing the frame B, I prefer to use two tubes 1 2, D-shaped in cross-section. The ends of the tubes 1 2 are united and secured to couplings 3 4' on the steering-head, the tubes having been bent as shown in Fig. 1, the frame thus constituting an upper member 4 and a lower member 5. Beginning at the connection of the lower member 5 of the frame with the steering-head the connected tubes 1 2 are curved downwardly to a point below the axis of the rear wheel and then upwardly and rearwardly to a point above the axis of the rear wheel, at which point the upper member 4 of the frame may be said to begin. The portions of the tubes forming the upper member of the frame are curved downwardly from a point over the axis of the rear wheel, being disposed in front of the rear wheel. At a point in proximity to the lower member 5 of the frame the portions of the tubes forming the upper member of the frame are bent rather abruptly and extended upwardly and forwardly to the coupling 3, which is located on the steering-head a short distance above the coupling 4' of the lower member 5 of the frame. The drop-frame is thus composed of two tubes, disposed practically parallel with each other throughout their entire length and bent to form the "dropped portion" 6 of the frame. Just in advance of the abruptly-curved portion of the upper member 4 of the frame the two members 4 5 make contact with each other and are secured by brazing, or preferably by means of a clamp 7, or in both ways, if desired. At the rear end of the frame the tubes 1 2 are separated for the accommodation of the rear wheel E, the tubes being preferably spaced apart by means of a small stay 8. To the rear portions of the tubes 1 2, which compose the lower member 5 of the frame, brackets 9 are secured and made with upwardly-projecting ears 10, in which the axle of the rear wheel is mounted, the rear portion of the frame being thus suspended from the axle of the rear wheel. Between the dropped portion of the upper member of the frame and the lower member of the frame the crank-hanger 11 is disposed. At this point the tubes 1 2, composing both the upper and the lower member of the frame, are separated, and to each tube a bracket 12 is secured for supporting the crank-hanger. The driving-sprocket 13 is disposed between the tubes 1 2 of the upper and lower members of the frame, and the crank-shaft 14 projects somewhat beyond the frame and is provided at its ends with the usual pedal-cranks 15. The hub of the rear wheel is provided with a sprocket-wheel 16, to which motion is imparted from the driving-sprocket by means of a sprocket-chain 17 in the usual way.

The entire rear portion of the frame from a point just in advance of the crank-hanger will preferably be closed by a network of lacing-cords, which will serve as guards to protect the gearing and to protect the clothing of the rider from engagement with the driving mechanism and the rear wheel of the bicycle. A thin sheet-metal plate 18, triangular in form, will preferably be secured between the tubes 1 2 over the rear wheel, and thus serve as a mud-guard to protect the back of the rider.

To the tubes 1 2, composing the upper or dropped member of the frame and preferably at or near the point thereon where said tubes begin to curve downwardly in front of the rear wheel, a bracket 19 is secured and adapted to sustain the seat 20 of the bicycle.

A bicycle constructed as above described is strong and not liable to twist under heavy strain, as has been the case with drop-frame bicycles as heretofore constructed. The machine is comparatively cheap to construct, avoids the use of the ordinary mud and dress guards by utilizing portions of the frame for these purposes, avoids the use of stay-rods which add to the weight and expense of bicycles of this class, and the bicycle is effectual in every respect in the performance of its functions.

Various slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. A bicycle-frame comprising a steering-head, and two semicircular or D-shaped tubes in cross-section, said tubes bent in the form of an oval loop or scoop and secured at their ends to the steering-head at different points with their flat faces secured together for some distance back from the steering-head, and spread apart to receive the rear wheel between them.

2. A bicycle-frame composed of a steering-head and two tubes semicircular or D-shaped in cross-section, said tubes bent into oval shape, the upper leads forming a dip and the ends bent upward and secured to the steering-head, the two tubes having their flat faces secured together for a portion of their lengths, spread apart a short distance at the bottom of the dip and then secured together again.

3. A bicycle-frame composed of a steering-head and two semicircular or D-shaped tubes in cross-section, said tubes bent to form an oval or loop, the flat faces of the tubes secured together in pairs during a portion of their lengths and the four leads secured together at one point, the ends of the tubes secured to the steering-head.

4. In a bicycle, the combination with a frame composed of two tubes bent into oval form and secured together for a portion of their length, the frame bent to form a dip and the two tubes bent apart at the bottom of the dip, of a crank-hanger secured beneath this dip, a crank-shaft journaled therein, and a sprocket-wheel secured on the crank-shaft and located and housed within the space formed by the tubes immediately beneath the dip.

5. In a bicycle, the combination with a frame consisting of a single sweep of rod or tubing, the upper member of said frame being bent to approach the lower member at a point between the ends of the frame, and a crank-hanger supported by the members of the frame where they approach each other, the members of the frame being secured together in advance of the crank-hanger, a crank-shaft supported in the hanger and a sprocket-wheel on said shaft, substantially as set forth.

6. In a bicycle, the combination with a single-sweep drop-frame, the upper member of which approaches the lower member at a point between the ends of the frame, said frame comprising two tubes secured together at the forward portions and separated at the rear portion of the bicycle and also where the members of the frame approach each other, of a crank-hanger disposed between the separated tubes where the members of the frame approach each other, brackets connecting the crank-hanger with the tubes of the frame, a driving-sprocket on the crank-shaft and between the tubes composing the respective members of the frame, brackets secured to the rear portion of the frame and having upwardly-projecting ears, a rear wheel disposed between the tubes at the rear end of the frame and an axle for said rear wheel mounted in the upwardly-projecting ears of said brackets and carrying a sprocket-wheel and a sprocket-chain connecting said sprocket-wheels between the tubes composing the respective members of the frame, substantially as set forth.

In testimony whereof I have signed this specification in the presence of two subscribing witnesses.

CHARLES R. HARRIS.

Witnesses:
JOHN E. KEIGHTLEY,
GEO. R. ZERCHER.